(12) United States Patent
Kiyose

(10) Patent No.: US 8,259,309 B2
(45) Date of Patent: Sep. 4, 2012

(54) OPTICAL POSITION DETECTION APPARATUS AND DISPLAY APPARATUS HAVING POSITION DETECTION FUNCTION

(75) Inventor: Kanechika Kiyose, Matsumoto (JP)

(73) Assignee: Seiko Epson Corporation (JP)

( * ) Notice: Subject to any disclaimer, the term of this patent is extended or adjusted under 35 U.S.C. 154(b) by 245 days.

(21) Appl. No.: 12/832,344

(22) Filed: Jul. 8, 2010

(65) Prior Publication Data

US 2011/0026038 A1    Feb. 3, 2011

(30) Foreign Application Priority Data

Jul. 31, 2009   (JP) ................................. 2009-178777
Mar. 17, 2010   (JP) ................................. 2010-060335

(51) Int. Cl.
*G01B 11/14*    (2006.01)
(52) U.S. Cl. ..................................................... 356/614
(58) Field of Classification Search .......................... None
See application file for complete search history.

(56) References Cited

U.S. PATENT DOCUMENTS 7,075,054 B2 *   7/2006   Iwamoto et al. ............... 250/221
7,465,914 B2 *  12/2008   Eliasson et al. ............... 250/221

FOREIGN PATENT DOCUMENTS

| JP | 2004-295644 | 10/2004 |
| JP | 2004-303172 | 10/2004 |

* cited by examiner

*Primary Examiner* — Tu Nguyen
(74) *Attorney, Agent, or Firm* — Harness, Dickey & Pierce, P.L.C.

(57) ABSTRACT

An apparatus for optically detecting an object position includes: position detection light sources irradiating light onto the object; a light guide plate receiving the light and emitting it onto a detection area to form an intensity distribution in the detection area; a light detector having light receiving portions receiving the light reflected by the object; and a signal processing portion detecting the object position based on the intensity distribution, wherein light incident portions receiving the light and side portions except for the light incident portions are provided on outer periphery side portions of the light guide plate, a light emission surface emitting the light incident from the light incident portions toward the detection area is provided on a plane portion of the light guide plate, and at least a portion of the side portions is an anti-reflection surface.

14 Claims, 10 Drawing Sheets

OPTICAL POSITION DETECTION APPARATUS AND DISPLAY APPARATUS HAVING POSITION DETECTION FUNCTION

This application claims priority to Japanese Patent Application Nos. 2009-178777 filed Jul. 31, 2009 and 2010-060335 filed Mar. 17, 2010 which are hereby expressly incorporated by reference herein in their entireties.

BACKGROUND

1. Technical Field

The present invention relates to an optical position detection apparatus and a display apparatus having a position detection function that is provided with the optical position detection apparatus.

2. Related Art

In an electronic appliance such as a portable phone, car navigation system, personal computer, ticket machine, bank terminal, or the like, a display apparatus having a position detection function, in which a touch panel is arranged on the front surface of an image generation apparatus such as a liquid crystal apparatus, has been used recently. In a display apparatus having the position detection function as described above, an input of information is performed while an image displayed on the image generation apparatus is referred to. The touch panel as described above is composed of a position detection apparatus for detecting the position of a target object in a detection area.

As detection types of the position detection apparatus, a resistive film type, an ultrasonic type, a capacitive type, an optical type, and the like, are known. The resistive film type is low-cost, but, like the capacitive type, has low transmissivity. The ultrasonic type or the capacitive type has a high response speed, but has a low environmental resistance. In contrast, the optical type has the characteristics of high environmental resistance, high transmissivity, and high response speed (see JP-A-2004-295644 and JP-A-2004-303172).

However, optical position detection apparatuses as described in JP-A-2004-295644 and JP-A-2004-303172 require light sources or light detectors near the display screen, the number of which corresponds to the resolution of position coordinates that should be detected, and thus are high-cost.

Accordingly, as schematically illustrated in FIGS. 10A and 10B, the inventor of the present invention is examining an optical position detection apparatus in which position detection light sources 12 are installed at end portions of a light guide plate 13 to face each other, and a light detector 15 detects a position detection light L2 that is emitted from the light guide plate 13 and reflected by a user's finger and so on. The optical position detection apparatus as described above has the advantages that it can detect the position of the finger and so on with a small number of position detection light sources 12 or light detectors 15 if there is a roughly linear relationship between the intensity of the position detection light L2 that is emitted from the light guide plate 13 and the distance from the position detection light source 12.

However, the optical position detection apparatus as illustrated in FIGS. 10A and 10B has a problem that when the position of the finger and so on is actually detected by the optical position detection apparatus, a large error may occur. As a result of examining the problem, the inventor of the present invention has newly found that such an error is caused by the scattering of the intensity distribution of the position detection light L2 in a detection area. That is, since in an area 13w that is spaced apart from the position detection light source 12 in a light guide plate 13, the position detection light L2 from the position detection light source 12 directly reaches the area 13w and the position detection light L2 that is reflected from an outer periphery side portion of the light guide plate 13 also reaches the area 13w, the light emission intensity of the position detection light L2 in the area 13w becomes high in comparison to other areas regardless of the fact that the area 13w is spaced apart from the position detection light source 12. In this case, the configuration as illustrated in FIGS. 10A and 10B is to explain the problem of the present invention, but does not refer to related art.

SUMMARY

An advantage of some aspects of the present invention is to provide an optical position detection apparatus and a display apparatus having a position detection function that is provided with the optical position detection apparatus, which can accurately perform position detection even in the case where a position detection method using the intensity distribution of the position detection light formed by the light guide plate is adopted.

According to an aspect of the invention, there is provided an optical position detection apparatus for optically detecting the position of a target object in a detection area, which includes position detection light sources that emit position detection light irradiated onto the target object; alight guide plate that receives the position detection light therein and emits the received position detection light onto the detection area to form an intensity distribution of a light emission quantity of the position detection light in the detection area; a light detector having light receiving portions arranged toward the detection area to receive the position detection light that is reflected by the target object; and a signal processing portion that detects the position of the target object based on the intensity distribution of the light emission quantity in the detection area, wherein the light guide plate is configured so that light incident portions for receiving the position detection light and side portions except for the light incident portions are provided on the outer periphery side portions when the light guide plate is seen in a plan view, a light emission surface that emits the position detection light incident from the light incident portions toward the detection area is provided on a plane portion when the light guide plate is seen in a plan view, and at least a portion of the side portions is an anti-reflection surface that prevents reflection of the position detection light in the light guide plate.

According to the aspect of the invention, if the position detection light that is emitted from a light emission surface of the light guide plate is reflected by a target object that is arranged on the emission side of the light guide plate, the reflected light is detected by the light detector. Here, if there is a predetermined correlation between the intensity of the position detection light in the detection area and a distance from the position detection light source, the position of the target object can be detected from a light receiving intensity that is obtained through the light detector. Accordingly, it is not necessary to arrange a plurality of optical devices along the detection area, and thus a position detection apparatus with low cost and with low power consumption can be configured. Here, in the aspect of the invention, in the outer periphery side portions of the light guide plate, at least a portion of the side portions except for the light incident portions is the anti-reflection surface. Accordingly, the light from the position detection light sources directly reach the area that is spaced apart from the position detection light sources, but by only this, it is difficult for the light reflected from the outer periphery side portions of the light guide plate to reach the area. Accordingly, it can be avoided that the light emission intensity of the position detection light emitted from the area that is spaced apart from the light detection light sources becomes heightened in comparison to that of other areas. In the aspect of the invention, even in the case where the position detection method using the intensity distribution of the position detection light formed by the light guide plate is adopted, the position detection light is emitted from the light guide plate with an appropriate intensity distribution, and thus the position detection can be accurately performed.

In the aspect of the invention, it is preferable that the entire surface of the side portion is the anti-reflection surface. In this configuration, the reflection of the position detection light can be prevented on the entire outer periphery side portion. Accordingly, since the position detection light is emitted from the light guide plate with more appropriate intensity distribution, the position detection can be performed more accurately.

In the aspect of the invention, it is preferable that the anti-reflection surface is formed by a light absorption layer formed on the side portion. In this configuration, it is not necessary to perform processes that trouble the light guide plate itself, and thus the anti-reflection surface can be easily formed.

When the aspect of the invention is applied to a case in which the light guide plate is in the form of a tetragonal plane, and the light incident portions are provided in portions corresponding to corners of the tetragon, a remarkable effect can be obtained. In the case where the light guide plate is tetragonal and the light incident portions are formed on the portions corresponding to corners of the tetragon, it cannot be avoided that the position detection light is headed toward the outer periphery side portions of the light guide plate. However, according to the aspect of the invention, even in the case of using the light guide plate as configured above, the position detection light is emitted from the light guide plate with an appropriate intensity distribution, and thus the position detection can be performed more accurately. In the aspect of the invention, the term "tetragon" means a tetragon that further includes a shape in which portions corresponding to corners of the tetragon are cut out.

When the aspect of the invention is applied to a case in which four position detection light sources are provided and in the light guide plate, the light incident portions are provided on portions that correspond to the four corners of the tetragon, a remarkable effect can be obtained. If the above-described configuration is adopted, it cannot be avoided that the position detection light is headed toward the outer periphery side portions of the light guide plate. However, according to the aspect of the invention, even in the case of using the light guide plate as configured above, the position detection light is emitted from the light guide plate with an appropriate intensity distribution, and thus the position detection can be performed more accurately.

When the aspect of the invention is applied to a case in which two neighboring position detection light sources among four position detection light sources simultaneously emit the position detection light, a remarkable effect can be obtained. If the above-described configuration is adopted, it cannot be avoided that the position detection light is headed toward the outer periphery side portions of the light guide plate. However, according to the aspect of the invention, even in the case of using the light guide plate as configured above, the position detection light is emitted from the light guide plate with an appropriate intensity distribution, and thus the position detection can be performed more accurately.

The optical position detection apparatus according to the aspect of the invention may be used to configure a display apparatus having a position detection function. In this case, the display apparatus having the position detection function has an image generation apparatus that forms an image in an overlapping area when the light guide plate is seen in a plan view. Examples of the image generation apparatus may be a projection display apparatus or a direct-view display apparatus, such as a liquid crystal apparatus, an organic electroluminescence apparatus, or the like.

The display apparatus having the position detection function according to the aspect of the invention may be used in an electronic appliance, such as a portable phone, car navigation system, personal computer, ticket machine, bank terminal, or the like, in addition to various kinds of display apparatuses.

According to another aspect of the invention, there is provided an optical position detection apparatus for optically detecting a position of a target object, which includes a light guide plate having light incident portions provided on four corner portions of an outer periphery portion; four position detection light sources that emit position detection light toward the light incident portions; a light detector that receives the position detection light which is emitted from one surface in a thickness direction of the light guide plate and is reflected by the target object; and a signal processing portion that detects the position of the target object based on the result of light received in the light detector, wherein the four position detection light sources emit the position detection light through alternate light-up by changing a combination of one portion of the position detection light sources and the other portion of the position detection light sources the number of which is equal to that of the one portion of the position detection light sources, and at least a portion of the outer periphery portions of the light guide plate except for the light incident portions is an anti-reflection surface that prevents reflection of the position detection light in the light guide plate.

According to this aspect of the invention, when the position detection light that is emitted from one side surface (a light emission surface) in a thickness direction of the light guide plate is reflected by a target object that is arranged on the emission side of the light guide plate, the reflected light is detected by the light detector. Here, if there is a predetermined correlation between the intensity of the position detection light in the detection area and the distance from the position detection light source, a position of the target object can be detected from a light receiving intensity that is obtained through the light detector. Accordingly, it is not necessary to arrange a plurality of optical devices along the detection region, and thus a position detection apparatus with low cost and with low power consumption can be configured. Here, in this aspect of the invention, in the outer periphery portions of the light guide plate, at least a portion in which the position detection light sources are not arranged is the anti-reflection surface. Accordingly, the light from the position detection light sources directly reach the area that is spaced apart from the position detection light sources, but it is difficult for the light reflected from the outer periphery portions of the light guide plate to reach the area. Accordingly, it can be avoided that the light emission intensity of the position detection light emitted from the area that is spaced apart from the light detection light sources becomes heightened in comparison to that of other areas. In this aspect of the invention, even in the case where the position detection method using the intensity distribution of the position detection light formed by the light guide plate is adopted, the position detection light is emitted from the light guide plate with an appropriate intensity distribution, and thus the position detection can be accurately performed.

In this aspect of the invention, it is preferable that in the outer periphery portions of the light guide plate, the entire portion in which the position detection light sources are not arranged is the anti-reflection surface. In this configuration, the reflection of the position detection light can be prevented in the entire portion in which the position detection light sources are not arranged among the outer periphery portions of the light guide plate. Accordingly, the position detection light can be emitted from the light guide plate with more appropriate intensity distribution, and thus the position detection can be performed more accurately.

In this aspect of the invention, the anti-reflection surface may adopt a configuration that is formed by a light absorption layer formed on the outer periphery portions of the light guide plate.

In this aspect of the invention, the outer periphery portions of the light guide plate may include the light incident portions provided on four corner portions thereof, and the light detector may adopt a configuration in which the light detector is arranged in an overlapping position in the thickness direction of the light guide plate with the center of the side portion that is interposed between the neighboring two corner portions among the four corner portions.

In this aspect of the invention, it is preferable that the position detection light is composed of infrared rays. In this case, the position detection light is not visually recognized.

The optical position detection apparatus according to the aspects of the invention can be used in a projection display apparatus having a position detection function. In this case, the light guide plate adopts a configuration in which one surface thereof crosses a direction in which the image is projected. Also, the projection display apparatus having the position detection function has the optical position detection apparatus according to the aspect of the invention and an image projection apparatus that projects the image.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
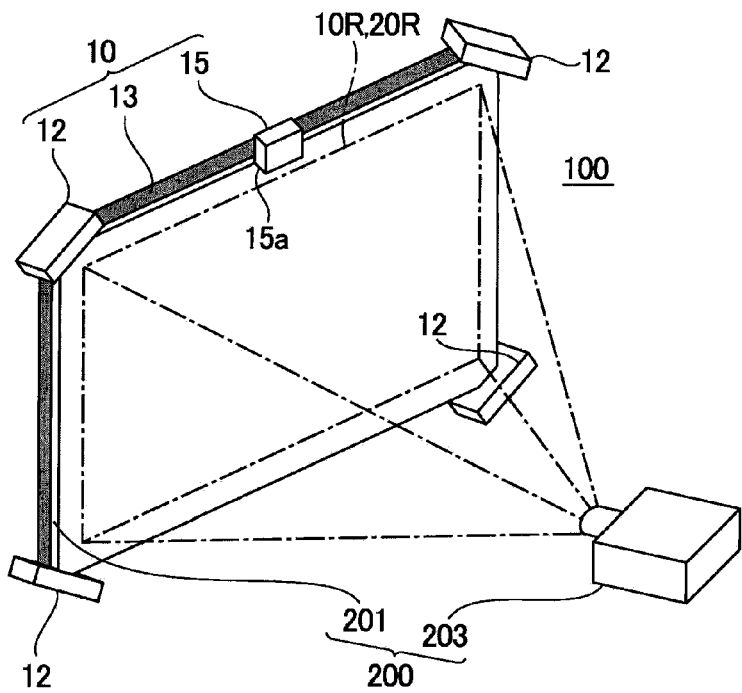
FIGS. 1A and 1B are explanatory views schematically illustrating a configuration of an optical position detection apparatus to which the invention is applied and a display apparatus having a position detection function that is provided with the optical position detection apparatus.
Figure 1B:
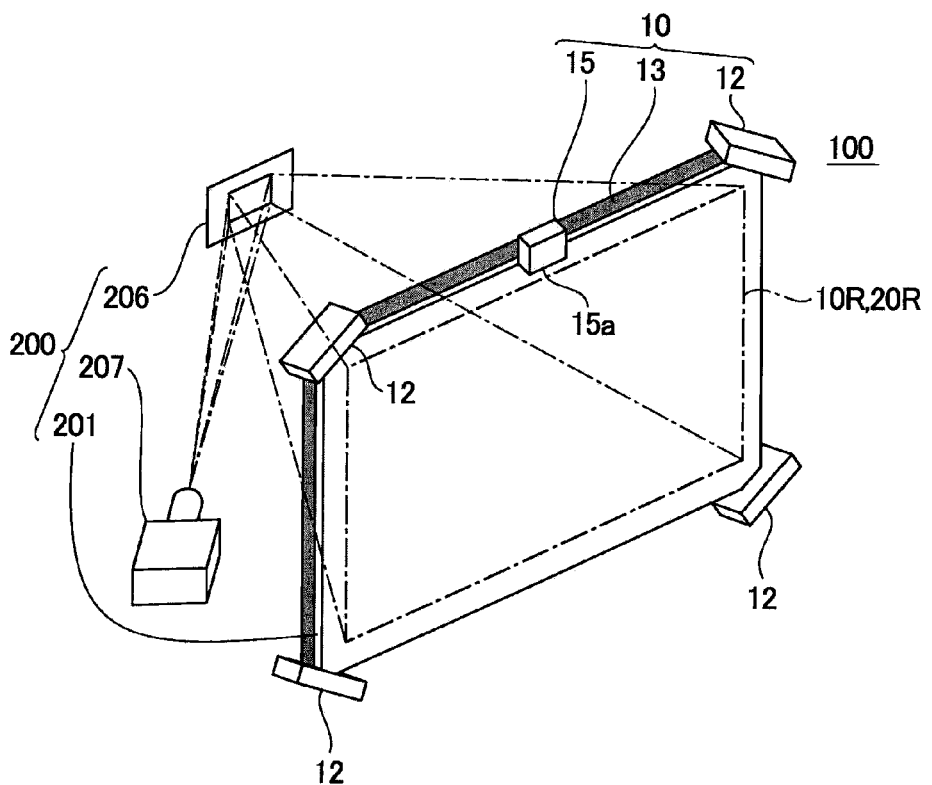

Hereinafter, embodiments of the invention will be described in detail with reference to the accompanying drawings.
Configurations of an Optical Position Detection Apparatus and a Display Apparatus Having a Position Detection Function the Entire Configuration of a Display Apparatus Having a Position Detection Function FIGS. 1A and 1B are explanatory views schematically illustrating a configuration of an optical position detection apparatus to which the invention is applied and a display apparatus having a position detection function that is provided with the optical position detection apparatus. Specifically, FIGS. 1A and 1B are an explanatory view illustrating a configuration example in the case of using a projection display apparatus that projects an image from the front (input manipulation side) with respect to an image projection surface, and an explanatory view illustrating a configuration example in the case of using a projection display apparatus that projects an image from the rear (opposite side to the input manipulation side) with respect to the image projection surface.

A display apparatus 100 having a position detection function as illustrated in FIGS. 1A and 1B is provided with an optical position detection apparatus 10 and an image generation apparatus 200. When a target object Ob such as a finger approaches a detection area 10R, the optical position detection apparatus 10 detects the plane position of the target object based on an image that is displayed by the image generation apparatus 200.

Specifically, as described later, the optical position detection apparatus 10 is provided with position detection light sources 12 that emit the position detection light, a light guide plate 13, and a light detector 15 having a light receiving portion 15a that faces on the detection area 10R.

In this embodiment of the invention, the image generation apparatus 200 is of a projection type, and has a screen-shaped projected surface 201 that is arranged to overlap the front surface side (input manipulation side) of the light guide plate 13. Also, the front surface (one surface in the thickness direction) of the light guide plate 13 and the projected surface 201 cross the projection direction of an image from the image generation apparatus 200. Due to this, the image generation apparatus 200 forms an image in an overlapping area when the light guide plate 13 is seen in a plan view. In this embodiment of the invention, an image forming area 20R is an area that substantially overlaps the detection area 10R of the optical position detection apparatus 10. Here, the projected surface 201 is made of a material that can transmit infrared rays such as white light and so on.

In the display apparatus 100 having the position detection function as illustrated in FIGS. 1A and 1B, the image generation apparatus 200 of the display apparatus 100 having the position detection function as illustrated in FIG. 1A is provided with a projection display apparatus 203 that projects an image from the front (input manipulation side). The image generation apparatus 200 of the display apparatus 100 having the position detection function as illustrated in FIG. 1B is provided with a mirror 206 arranged in the rear (the opposite side to the input manipulation side) of the light guide plate 13 and the projected surface 201, and a projection display apparatus 207 that projects an image toward the mirror 206.

Detailed Configuration of an Optical Position Detection Apparatus 10

Figure 2A:
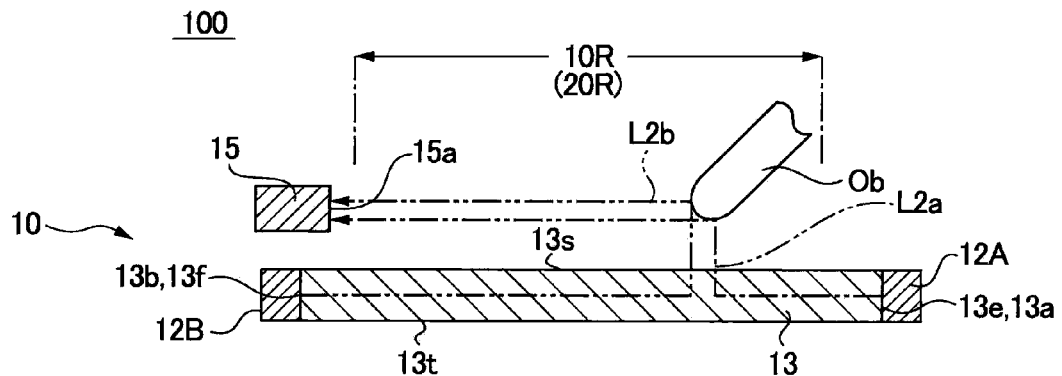
FIGS. 2A to 2C are explanatory views illustrating a detailed configuration of the optical position detection apparatus to which the invention is applied.
Figure 2B:
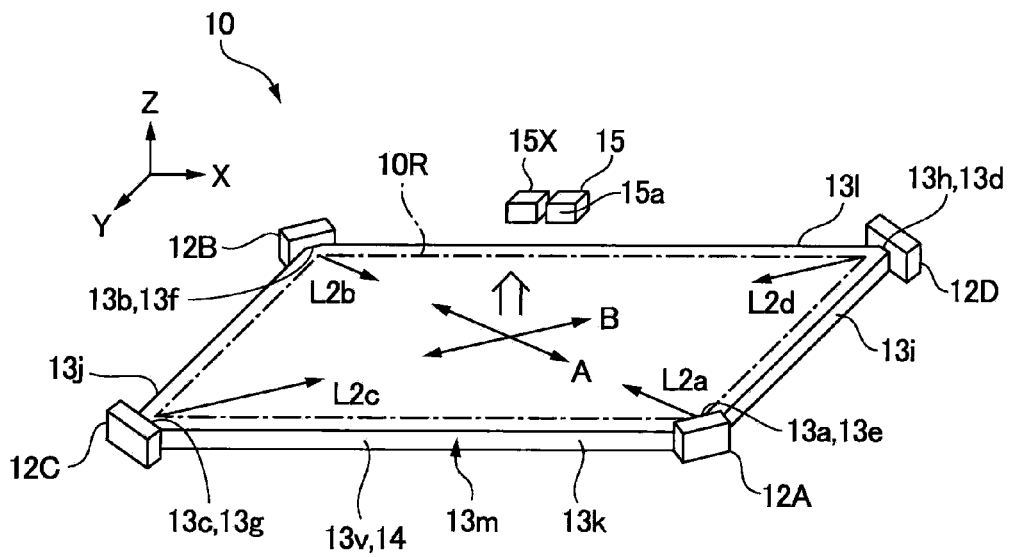
Figure 2C:
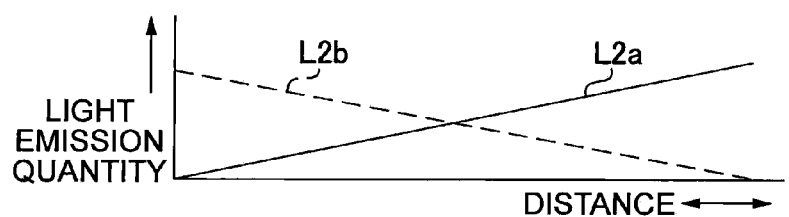

FIGS. 2A to 2C are explanatory views illustrating a detailed configuration of the optical position detection apparatus to which the invention is applied. Specifically, FIGS. 2A, 2B, and 2C are an explanatory view schematically illustrating a cross-sectional configuration of the optical position detection apparatus, an explanatory view illustrating a configuration of a light guide plate and so on that is used in the optical position detection apparatus, and an explanatory view illustrating an attenuation state of the position detection infrared rays in the light guide plate.

As illustrated in FIGS. 2A and 2B, in the optical position detection apparatus 10 according to this embodiment of the invention, the light guide plate 13 is in the form of a tetragon or briefly in the form of a tetragonal plane. Accordingly, the optical position detection apparatus 10 is provided with four position detection light sources 12A to 12D (the position detection light sources 12 as illustrated in FIGS. 1A and 1B) that emit position detection light L2a to L2d, the light guide plate 13 having four light incident portions 13a to 13d which are provided on a surrounding outer periphery side portion 13m of the light guide plate and to which the position detection light L2a to L2d is incident, and the light detector 15 that faces the light receiving portion 15a in the detection area 10R. The light guide plate 13 has a light emission surface 13s provided on one surface (upper surface as illustrated) to emit the position detection light L2a to L2d having propagated through the inside of the light guide plate 13, and the light emission surface 13s and the outer periphery side portion 13m are orthogonal to each other. That is, when the light guide plate 13 is seen in a plan view, one surface of the light guide plate 13 in the thickness direction becomes the light emission surface 13s, and the outer periphery portion thereof in the thickness direction becomes the outer periphery side portion 13m that is orthogonal to the light emission surface 13s.

In this embodiment of the invention, the four position detection light sources 12A to 12D and the four light incident portions 13a to 13d are all installed in positions that correspond to the corners 13e, 13f, 13g, and 13h of the light guide plate 13. Accordingly, the outer periphery side portion 13m, when the light guide plate 13 is seen in a plan view, is provided with the light incident portions 13a to 13d that receive the position detection light L2a to L2d and side portions 13i, 13j, 13k, and 13l other than the light incident portions 13a to 13d. The light incident portions 13a to 13d, for example, are configured by sectional surfaces formed by removing the corner portions of the light guide plate 13. The position detection light sources 12A to 12D are arranged to face the light incident portions 13a to 13d, and preferably, are arranged to close contact to the light incident portions 13a to 13d. In this embodiment of the invention, a compensation light detector 15x is used in addition to the light detector 15. The compensation light detector 15x is to compensate for the influence of a temperature or the like upon the result of detection that is obtained through the light detector 15 rather than to detect the position detection light L2a to L2d.

The light guide plate 13 is formed of a transparent resin plate such as polycarbonate or acrylic resin. On the light emission surface 13s of the light guide plate 13 or the rear surface 13t that is opposite to the light emission surface 13s, a surface concavo-convex structure, a prism structure, a scattering layer (not illustrated), and the like, are installed. By such a light scattering structure, the light, which are incident from the light incident portions 13a to 13d and propagate through the inside of the light guide plate, are gradually deflected as they travel in their propagation directions, and then are emitted from the light emission surface 13s. In this case, on the light emission side of the light guide plate 13, optical sheets such as a prism sheet, a light scattering plate, and the like, may be arranged to seek the uniformity of the position detection light L2a to L2d, if necessary.

The position detection light sources 12A to 12D are composed of light emitting devices, for example, such as LEDs (Light Emitting Diodes), and emit the position detection light L2a to L2d composed of infrared rays in accordance with drive signals output from a driving circuit (not illustrated). The type of the position detection light L2a to L2d is not specially limited, but it is preferable that they have a wavelength distribution that is different from that of visible light, or they have different light emitting features through the addition of modulation such as flickering thereto. Also, it is preferable that the position detection light L2a to L2d have a wavelength area which can be efficiently reflected by a target object Ob such as a finger or a touch pen. Accordingly, if the target object Ob is part of a human body such as a finger and so on, it is preferable that the position detection light may be infrared rays (especially, near infrared rays that is near to the visible light region, for example, having a wavelength in the neighborhood of 850 nm) having a high reflection rate on the surface of the human body or may have the wavelength of 950 nm. Also, if the position detection light L2 is the infrared rays, it has the advantage that the position detection light L2 is not visually recognized.

Basically, a plurality of position detection light sources 12A to 12D is installed, and emits the position detection light L2a to L2d in different positions, respectively. Among the four position detection light sources 12A to 12D, the position detection light sources in diagonal positions form a pair to constitute a first light source, and other two position detection light sources form a pair to constitute a second light source. Also, among the four position detection light sources 12A to 12D, two neighboring position detection light sources may form a pair to constitute a first light source pair, and other two position detection light sources may form a pair to constitute a second light source pair.

In the display apparatus 100 having the position detection function as configured above, the position detection light L2a and the position detection light L2b propagate in opposite directions as indicated by arrows A within the light guide plate 13, and are emitted from the light emission surface 13s. Also, the position detection light L2c and the position detection light L2d propagate in opposite directions that cross the directions as indicated by the arrows A (directions indicated by arrows B), respectively, and are emitted from the light emission surface 13s.

The detection area 10R is a plane range in which the position detection light L2a to L2d is emitted to the visually recognizable side (manipulation side) and in which reflected light due to the target object Ob may occur. In this embodiment of the invention, the plane shape of the detection area 10R is a tetragon, and the light detector 15 is arranged roughly in the center portion in the length direction of one long-side portion among four side portions of the detection area. That is, the light detector 15 is arranged in an overlapping position in the thickness direction of the light guide plate 13 with respect to the side portion 13l that is inserted between the neighboring corner portions (optical incident portions 13b and 13d) in the light guide plate 15. In the detection area 10R, the inside angle of the corner portions of the neighboring sides is set to 90 degrees, and this inside angle is equal to the inside angle of the corner portions 13e to 13h of the light guide plate 13.

Basic Principle

A method of acquiring position information of the target object Ob based on the detection of the light detector will be described. Various position information acquisition methods may be considered, and as one example of such methods, for example, a method of obtaining position coordinates in a direction in which two corresponding light sources are connected may be performed by obtaining the ratio of attenuation coefficients of two position detection light based on the ratio of the detected light quantities of the position detection light and obtaining propagation distances of both the position detection light from the ratio of the attenuation coefficients.

First, in a display apparatus 100 having a position detection function according to an embodiment of the invention, position detection light L2a to L2d emitted from the position detection light sources 12A to 12D are incident from light incident portions 13a to 13d to the inside of a light guide plate 13, travel within the light guide plate 13, and are gradually emitted from a light emission surface 13s. As a result, the position detection light L2a to L2d is emitted in the form of a surface from the light emission surface 13s.

For example, the position detection light L2a from the light incident portion 13a travels within the light guide plate 13 toward the light incident portion 13b, and is gradually emitted from the light emission surface 13s. In the same manner, the position detection light L2c and L2d travel within the light guide plate 13, and are gradually emitted from the light emission surface 13s. Accordingly, if a target object Ob such as a finger is arranged in the detection area 10R, the position detection light L2a to L2d is reflected by the target object Ob, and a portion of the reflected light is detected by the light detector 15.

Here, the light quantity of the position detection light L2a that is emitted onto the detection area 10R is linearly attenuated according to the distance from the position detection light source 12A as indicated as a solid line in FIG. 2C, and the light quantity of the position detection light L2b that is emitted onto the detection area 10R is linearly attenuated according to the distance from the position detection light source 12B as indicated as a dotted line in FIG. 2C.

Also, if it is assumed that the control amount (e.g. current amount), conversion coefficient, and light emission quantity of the position detection light source 12A are Ia, k, and Ea, and the control amount (e.g. current amount), conversion coefficient, and light emission quantity of the position detection light source 12B are Ib, k, and Eb, the following is realized.

$Ea = k \cdot Ia$ $Eb = k \cdot Ib$

Also, if it is assumed that the attenuation coefficient and detected light quantity of the position detection light L2a are fa and Ga, and the attenuation coefficient and detected light quantity of the position detection light L2b are fb and Gb, the following is realized.

$Ga = fa \cdot Ea = fa \cdot k \cdot Ia$ $Gb = fb \cdot Eb = fb \cdot k \cdot Ib$ Accordingly, if it is assumed that Ga/Gb, which is the ratio of detected light quantities of both the position detection light, can be detected in the light detector 15, the following is realized.

$Ga/Gb = (fa \cdot Ea)/(fb \cdot Eb) = (fa/fb) \cdot (Ia/Ib)$

Accordingly, if values that correspond to the ratio of light emission quantities Ea/Eb and the ratio of control amounts Ia/Ib are known, the ratio of attenuation coefficients fa/fb can also be known. If there is a linear relationship between the ratio of the attenuation coefficients and the ratio of traveling distances of both the position detection light, position information of the target object Ob can be obtained through presetting of the linear relationship.

As a method of obtaining the ratio of the attenuation coefficients fa/fb, for example, the position detection light source 12A and the position detection light source 12B are turned on and off in reverse phase (for example, square wave or sine wave drive signals are operated to have a phase difference of 180° at a frequency where the phase difference due to the difference between the traveling distances can be disregarded), and then the waveforms of the detected light quantities are analyzed. More realistically, for example, the control amount Ia of one side is fixed (Ia=Im), the control amount Ib of the other side is controlled so that the detected waveform is unable to be observed, that is, so that the ratio of detected light quantities Ga/Gb becomes "1", and the ratio of attenuation coefficients fa/fb is derived from the control amount Ib=Im·(fa/fb) at that time.

Also, the following is realized so that the sum of the control amounts is constant.

$Im = Ia + Ib$

In this case, since the following equation is satisfied, $Ib = Im \cdot fa/(fa+fb)$ $fa/(fa+fb) = \alpha,$ the ratio of attenuation coefficients is obtained by the following equation.

$fa/fb = \alpha/(1-\alpha)$

Accordingly, the position information in a direction indicated by an arrow A of the target object Ob can be acquired by driving the position detection light source 12A and the position detection light source 12B in reverse phase. Also, the position information in a direction indicated by an arrow B of the target object Ob can be acquired by driving the position detection light source 12C and the position detection light source 12D in reverse phase. Accordingly, in the control system, the position coordinates on the XY plane of the target object Ob can be acquired by sequentially performing the detection operation in directions A and B. That is, according to the optical position detection apparatus 10 in this embodiment, the position coordinates on the XY plane of the target object Ob is acquired by emitting the position detection light through an alternative light-up by changing the combination of the position detection light sources of one portion and the position detection light sources of the other portion with the same number among four position detection light sources 12A to 12D.

As described above, in acquiring the plane position information inside the detection area 10R of the target object Ob based on the ratio of light quantities of the position detection light detected by the light detector 15, a microprocessor unit (MPU) is used as the signal processing portion, and accordingly, a configuration that performs processing according to the execution of predetermined software (operation program)

may be adopted. Also, to be described later with reference to FIGS. 3A and 3B, a configuration in which a signal processing portion using hardware such as a logic circuit performs the processing may be adopted. The signal processing portion may be inserted as apart of a display apparatus 100 having the position detection function, or may be configured inside an electronic appliance on which the display apparatus 100 having the position detection function is mounted.

Configuration Example of a Signal Processing Portion

Figures 3A, 3B:
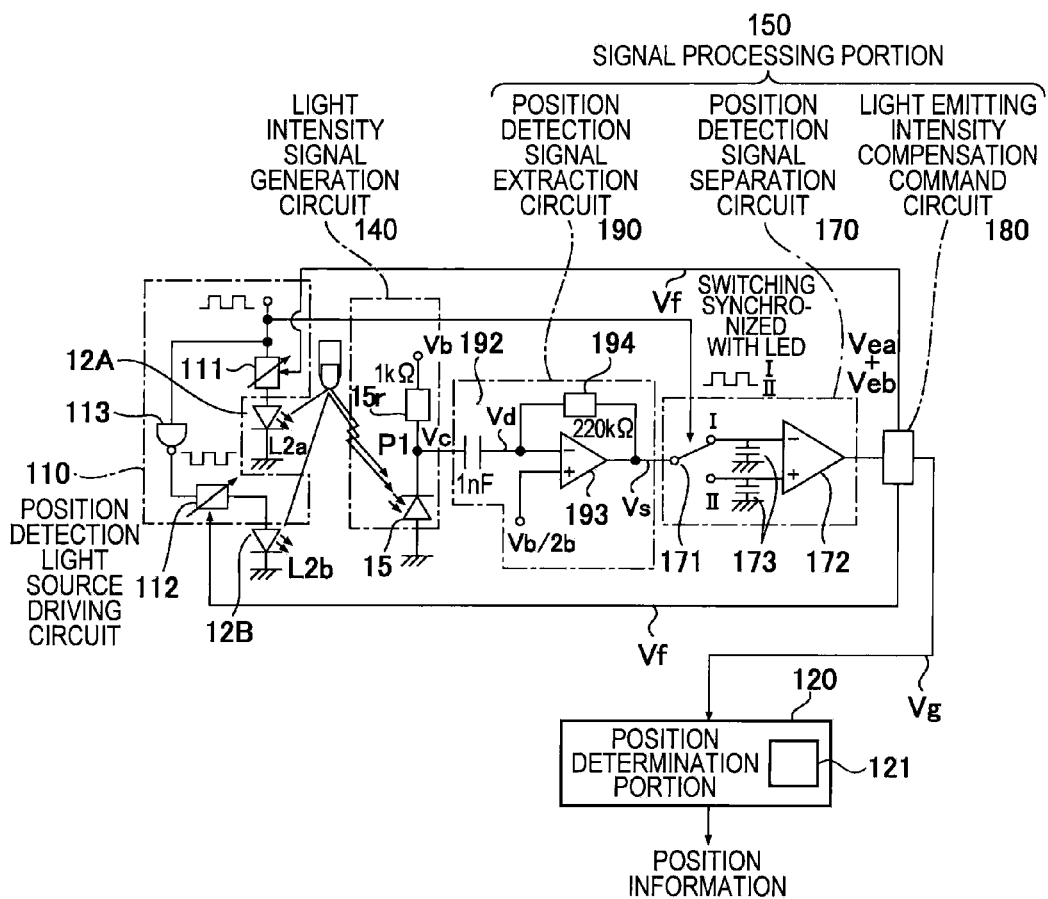
FIGS. 3A and 3B are explanatory views illustrating the contents of signal processing in the optical position detection apparatus to which the invention is applied and the display apparatus having the position detection function.

FIGS. 3A and 3B are explanatory views illustrating the contents of signal processing in the optical position detection apparatus 10 to which the invention is applied and the display apparatus 100 having the position detection function. FIGS. 3A and 3B are explanatory views illustrating the optical position detection apparatus 10 to which the invention is applied and the display apparatus 100 having the position detection function and the contents of processing in a light emitting intensity compensation command portion of the signal processing portion.

As illustrated in FIG. 3A, in the optical position detection apparatus 10 and the display apparatus 100 having the position detection function according to this embodiment, a position detection light source driving circuit 110 applies a drive pulse to the position detection light source 12A through a variable resistor 111, and applies a drive pulse to the position detection light source 12B through an inversion circuit 113 and a variable resistor 112. Accordingly, the position detection light source driving circuit 110 modulates position detection light L2a and L2b by applying an inverse drive pulse to the position detection light source 12A and the position detection light source 12B, and emits the modulated position detection light. Also, a common light detector 15 receives the light which is the position detection light L2a and L2B reflected from a target object Ob. In a light intensity signal generation circuit 140, a resistor 15r of about 1 kΩ is electrically connected in series to the light detector 15, and a bias voltage Vb is applied to both end terminals thereof.

In the light intensity signal generation circuit 140, a signal processing portion 150 is electrically connected to a connection point P1 of the light detector 15 and the resistor 15r. A detection signal Vc output from the connection point P1 of the light detector 15 and the resistor 15r is indicated by the following equation.

$$Vc = V15 (V15 + \text{resistance value of the resistor } 15r)$$

Here, V15 is an equivalent resistance of the light detector 15.

Accordingly, if a case where an environmental light is not incident to the light detector 15 and a case where an environmental light is incident to the light detector 15 are compared with each other, the level and the amplitude of the detection signal Vc become greater in the case where the environmental light is incident to the light detector 15.

The signal processing portion 150 is briefly provided with a position detection signal extraction circuit 190, a position detection signal separation circuit 170, and a light emitting intensity compensation command circuit 180.

The position detection signal extraction circuit 190 is provided with a filter 192 composed of a capacitor of about 1 nF, and this filter 192 functions as a high-pass filter that removes a DC component from the signal output from the connection point P1 of the light detector 15 and the resistor 15r. Accordingly, by the filter 192, the position detection signal Vd of the position detection light L2a and L2b by the light detector 15 is extracted from the detection signal Vc output from the connection point P1 of the light detector 15 and the resistor 15r. That is, since the environmental light can be considered to have a constant intensity in a certain period in comparison to the modulated position detection light L2a and L2b, a low-frequency component or the DC component due to the environmental light is removed by the filter 192.

Also, the position detection signal extraction circuit 190 has an addition circuit 193 that is provided with a feedback resistor 194 of about 220 kΩ at the rear end of the filter 192, and the position detection signal Vd extracted by the filter 192 is output to the position detection signal separation circuit 170 as a position detection signal Vs which overlaps a voltage V/2 that is ½ of the bias voltage Vb.

The position detection signal separation circuit 170 is provided with a switch 171 that performs a switching operation in synchronization with a drive pulse that is applied to the position detection light source 12A, a comparator 172, and a capacitor 173 that is electrically connected to input lines of the comparator 172. Accordingly, if the position detection signal Vs is input to the position detection signal separation circuit 170, an effective value Vea of the position detection signal Vs in a period when the position detection light L2a lights up and an effective value Veb of the position detection signal Vs in a period when the position detection light L2b lights up are alternately output from the position detection signal separation circuit 170 to the light emitting intensity compensation command circuit 180.

The light emitting intensity compensation command circuit 180 performs a process as illustrated in FIG. 3B by comparing the effective values Vea and Veb, and outputs a control signal Vf to the position detection light source driving circuit 110 so that the effective value Vea of the position detection signal Vs in a period when the position detection light L2a lights up and the effective value Veb of the position detection signal Vs in a period when the position detection light L2b lights up become the same level. That is, the light emitting intensity compensation command circuit 180 compares the effective value Vea of the position detection signal Vs in a period when the position detection light L2a lights up and the effective value Veb of the position detection signal Vs in a period when the position detection light L2b lights up with each other, and if they are the same value, the light emitting intensity compensation command circuit 180 maintains the driving condition of the current state of the position detection light sources 12A and 12B. In contrast, if the effective value Vea of the position detection signal Vs in a period when the position detection light L2a lights up is lower than the effective value Veb of the position detection signal Vs in a period when the position detection light L2b lights up, the light emitting intensity compensation command circuit 180 heightens the light emission quantity of the position detection light source 12A by lowering the resistance value of the variable resistor 111. Also, if the effective value Veb of the position detection signal Vs in a period when the position detection light L2b lights up is lower than the effective value Vea of the position detection signal Vs in a period when the position detection light L2a lights up, the light emitting intensity compensation command circuit 180 heightens the light emission quantity of the position detection light source 12B by lowering the resistance value of the variable resistor 112.

By doing this, in the optical position detection apparatus 10 and the display apparatus 100 having the position detection function, the light emitting intensity compensation command circuit 180 of the signal processing portion 150 controls the control amount (current amount) of the position detection light sources 12A and 12B so that the detection amounts of the position detection light L2a and L2b, which is detected by the light detector 15, become equal to each other. Accordingly, the light emitting intensity compensation command circuit 180 outputs to the position determination portion 120 information regarding the control amounts of the position detection light sources 12A and 12B so that the effective value Vea of the position detection signal Vs in a period when the position detection light L2a lights up and the effective value Veb of the position detection signal Vs in a period when the position detection light L2b lights up become the same level, as the position detection signal Vg, and thus the position determination portion 120 can obtain the position coordinates in a direction indicated by an arrow A of the target object Ob in the detection area 10R. Also, using the same principle, the position determination portion can obtain the position coordinates in a direction indicated by an arrow B of the target object Ob in the detection area 10R. Accordingly, the position determination portion can acquire the position coordinates in an XY plane of the target object Ob.

Also, in this embodiment of the invention, in the position detection signal extraction circuit 190, the filter 192 extracts the position detection signal Vd by removing the DC component which is caused by the environmental light from the detection signal Vc output from the connection point P1 of the light detector 15 and the resistor 15r. Accordingly, even in the case where the detection signal Vc output from the connection point P1 of the optical detector 15 and the resistor 15r includes a signal component which is caused by an infrared component of the environmental light, the influence of the environmental light can be cancelled.

Other Position Detection Methods

In the optical position detection apparatus 10 in this embodiment, the following configuration may be adopted in addition to the above-described configuration, in which the four position detection light sources 12A to 12D emit the position detection light through alternate light-up by changing a combination of one portion of the position detection light sources and the other portion of the position detection light sources the number of which is equal to that of the one portion of the position detection light sources. That is, in the optical position detection apparatus 10 in this embodiment of the invention, the position detection light for detecting the position in a first direction (X direction) may be generated by driving the position detection light sources 12A and 12D in phase, driving the position detection light sources 12B and 12C in phase, and driving the position detection light sources 12A and 12D and the position detection light sources 12B and 12C in reverse phase. In this case, in another timing, the position detection light for detecting the position in a second direction (Y direction) may be generated by driving the position detection light sources 12A and 12C in phase, driving the position detection light sources 12B and 12D in phase, and driving the position detection light sources 12A and 12C and the position detection light sources 12B and 12D in reverse phase. Even in this method, the position coordinates on the XY plane of the target object Ob can be acquired. According to the configuration whereby a plurality of position detection light sources light up simultaneously, for example, the contrast inclination distribution of the position detection light is appropriately obtained in a wider region than that of the configuration whereby one position detection light source lights up, and thus more accurate position detection becomes possible. Also, in the case of performing the position detection in a long-side direction of the light guide plate (detection region 10R), the position detection in the long-side direction is performed based on the difference in results of detection by the light detector 15 between the period in which the position detection light sources 12A and 12D light up and the period in which the position detection light sources 12B and 12C light up. Also, in the case of performing the position detection in a short-side direction of the light guide plate 13 (detection region 10R), the position detection in the short-side direction is performed based on the difference in results of detection by the light detector 15 between the period in which the position detection light sources 12A and 12C light up and the period in which the position detection light sources 12B and 12D light up. Even by this method, the influence of the environmental light can be cancelled. Also, if the intensity distribution as illustrated in FIG. 2C corresponds to simple increase or simple decrease, the position detection can be performed even in the case where there is no linear relationship.

Also, the position of the target object Ob in the Z-axis direction may be detected by making all of the four position detection light sources 12A to 12D light up.

Detailed Configuration of a Light Guide Plate

Figure 4:
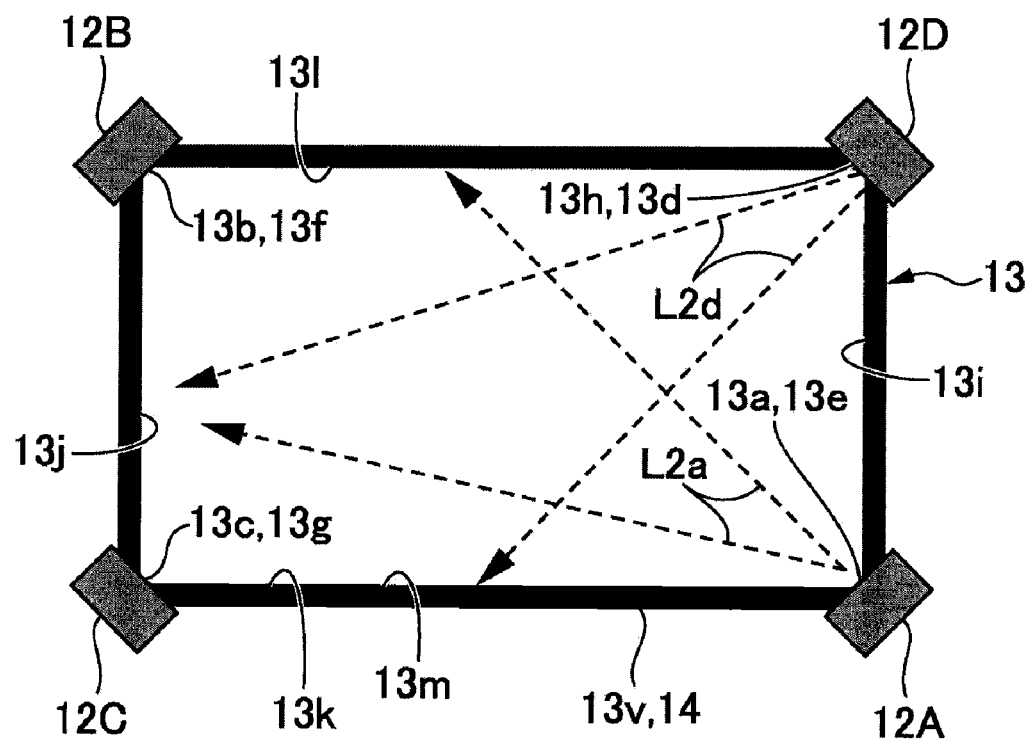
FIG. 4 is a plan view of a light guide plate that is used in an optical position detection apparatus to which the invention is applied and a display apparatus having a position detection function.

FIG. 4 is a plan view illustrating the light guide plate 13 that is used in the optical position detection apparatus 10 to which the invention is applied and the display apparatus 100 having the position detection function.

Figure 10A:
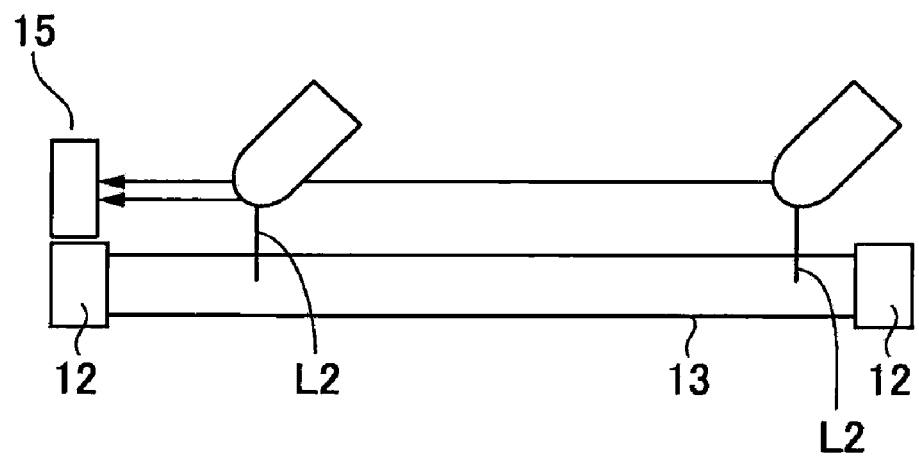
FIGS. 10A and 10B are explanatory views illustrating a basic configuration of an optical position detection apparatus.
Figure 10B:
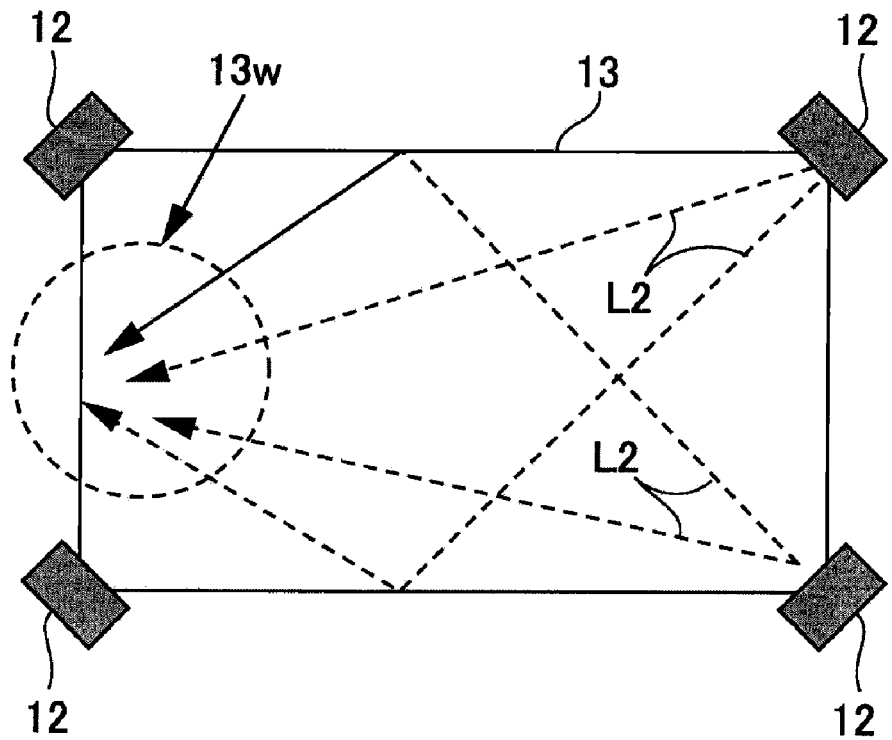

The optical position detection apparatus 10 according to an embodiment of the invention is on the assumption that there is a predetermined correlation between the intensity of the position detection light L2a to L2d emitted from the light guide plate 13 and the distance from the position detection light sources 12A to 12D. However, if a difference in intensity distribution occurs, which has been explained with reference to FIG. 10B, the detection accuracy is deteriorated.

Accordingly, in the embodiment of the invention, as illustrated in FIGS. 2B and 4, at least a portion of the outer periphery side portion 13m of the light guide plate 13, except for the light incident portions 13a to 13d, becomes an anti-reflection surface 13v. In this embodiment of the invention, the entire surface of the side portions 13i, 13j, 13k, and 13l, except for the light incident portions 13a to 13d, among the outer periphery side portion 13m of the light guide plate 13 becomes an anti-reflection surface 13v, and the entire surface of the outer periphery side portion 13m of the light guide plate 13 except for the light incident portions 13a to 13d becomes the anti-reflection surface 13v.

In forming the anti-reflection surface 13v, in this embodiment of the invention, a light absorption layer 14, which is a black metal layer such as chrome or a black film, is laminated on the side portions 13i, 13j, 13k, and 13l of the section surface 13m.

Accordingly, as illustrated in FIG. 4, the light headed toward the side portions 13i, 13j, 13k, and 13l (anti-reflection surface 13v) among the position detection light L2a to L2d incident from the light incident portions 13a to 13d in the light guide plate 13 are absorbed by the light absorption layer 14, and are not reflected.

Primary Effects of the Embodiment

As described above, in the optical position detection apparatus 10 according to this embodiment and the display apparatus 100 having the position detection function, if the position detection light L2a to L2d is emitted from the light emission surface 13s of the light guide plate 13 and are reflected by the target object Ob arranged on the emission side of the light guide plate 13, the reflected light is detected by the light detector 15. Here, if there is a predetermined correlation between the intensity of the position detection light L2a to L2d in the detection area 10R and the distance from the position detection light sources 12A to 12D, the position of the target object Ob can be detected from the light receiving intensity obtained through the light detector 15. Accordingly, it is not necessary to arrange a plurality of light elements along the detection region 10R, and thus the position detection apparatus 10 with low cost and with low power consumption can be configured.

Here, in this embodiment of the invention, the outer periphery portion 13m except for the light incident portions 13a to 13d in the light guide plate 13 is the anti-reflection surface 13v. Accordingly, as illustrated in FIG. 4, the light from the position detection light sources 12A to 12D directly reach the area that is spaced apart from the position detection light sources 12A to 12D, but it is difficult for the light reflected from the outer periphery side portions 13m of the light guide plate 13 to reach the area. Accordingly, it can be avoided that the light emission intensity of the position detection light emitted from the area that is spaced apart from the light detection light sources 12A to 12D becomes heightened in comparison to that of other areas. In the embodiment of the invention, even in the case where the position detection method using the intensity distribution of the position detection light L2a to L2d formed by the light guide plate 13 is adopted, the position detection light L2a to L2d is emitted from the light guide plate 13 with an appropriate intensity distribution. Accordingly, in this embodiment of the invention, the position detection can be accurately performed.

Particularly, in this embodiment of the invention, since the entire surface of the outer periphery side portion 13m except for the light incident portions 13a to 13d is the anti-reflection surface 13v, the reflection of the position detection light can be prevented on the entire outer periphery portion 13m. Accordingly, the position detection light L2a to L2d is emitted from the light guide plate 13 with more appropriate intensity distribution, and thus the position detection can be performed more accurately.

Also, in this embodiment of the invention, even in the case where the light guide plate 13 is in the form of a tetragon or briefly in the form of a tetragonal plane, and the light incident portions 13a to 13d are provided in four corner portions of the tetragon, the position detection can be accurately performed. In the case of adopting such a configuration, it cannot be avoided that the position detection light L2a to L2d is headed toward the outer periphery side portion 13m of the light guide plate 13. However, according to this embodiment of the invention, even in the case of using the light guide plate 13 as configured above, the reflection of the position detection light does not occur in the outer periphery side portion 13m. Accordingly, the position detection light is emitted from the light guide plate 13 with an appropriate intensity distribution, and thus the position detection can be performed more accurately.

Also, even in the case where two neighboring position detection light sources among four position detection light sources 12A to 12D simultaneously emit the position detection light, the position detection can be accurately performed. That is, as illustrated in FIG. 4, if the two position detection light sources 12A and 12D simultaneously emit the position detection light L2a and L2d, the light reflected from the outer periphery side portions 13m of the light guide plate 13 are concentrated, and thus the intensity distribution of the position detection light L2a to L2d is remarkably scattered. However, in this embodiment of the invention, even in the case of adopting such a driving method, the position detection light is emitted from the light guide plate 13 with an appropriate intensity distribution, and thus the position detection can be performed more accurately.

Also, in this embodiment of the invention, the anti-reflection surface 13v is configured by the light absorption layer 14 formed on the outer periphery side portion 13m. Accordingly, it is not necessary to perform processes that trouble the light guide plate 13 itself, and thus the anti-reflection surface 13v can be easily formed.

Other Embodiment

The optical position detection apparatus 10 and the display apparatus 100 having a position detection function are not limited to the foregoing embodiments, and various modifications may be made without departing from the scope of the invention. For example, in the above-described embodiment, although the anti-reflection surface 13v is configured by the light absorption layer 14 formed on the outer periphery side portion 13m, the anti-reflection surface 13v for preventing the reflection by the light scattering may be configured by forming fine concavo-convexes on the outer periphery side portions 13m. Also, since the wavelength of the position detection light L2a to L2d is constant, the anti-reflection surface 13v may also be configured by forming a dielectric multi-layer on the outer periphery side portions 13m. In this case, it is sufficient if the light absorption layer 14 (anti-reflection surface 13v) is formed only on a portion of the outer periphery side portion 13m except for the light incident portions 13a to 13d. Also, in the embodiment of the invention, although only one light detector 15 is installed, one or more other light detectors may be arranged in an appropriate position.

Modified Example of Display Apparatus 100 Having Position Detection Function

In the above embodiment, the configuration including the projection type display apparatus 203, 207 as the image generation apparatus 200 is explained. However, as shown in FIGS. 5 to 8, if a direct view type display apparatus is employed as the image generation apparatus 200, it can be used in an electronic apparatus described later with reference to FIGS. 10A and 10B.

Modified Example 1 of Display Apparatus 100 Having Position Detection Function

Figure 5:
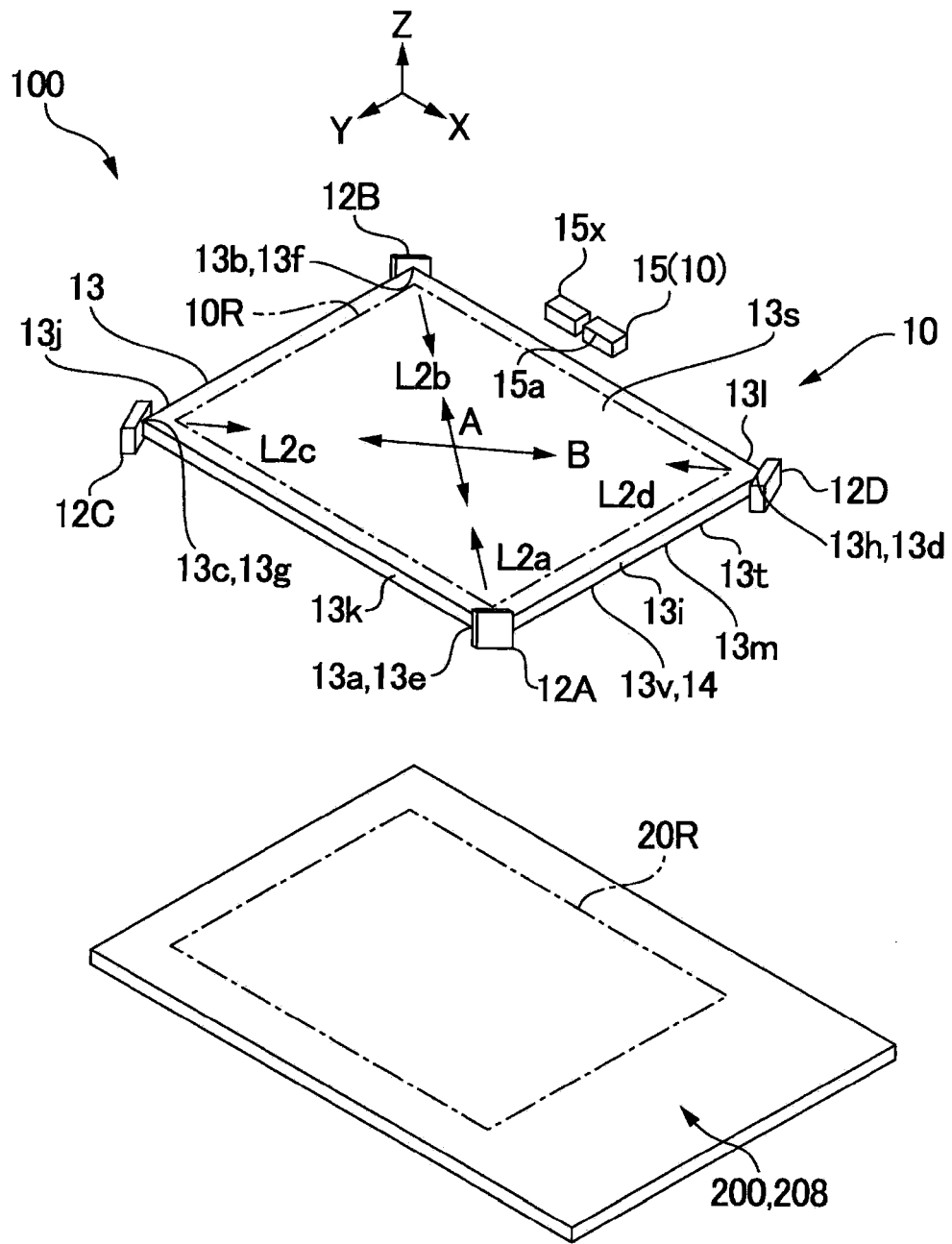
FIG. 5 is an exploded perspective view of an optical position detection apparatus according to a modified example 1 of the invention.
Figure 6:
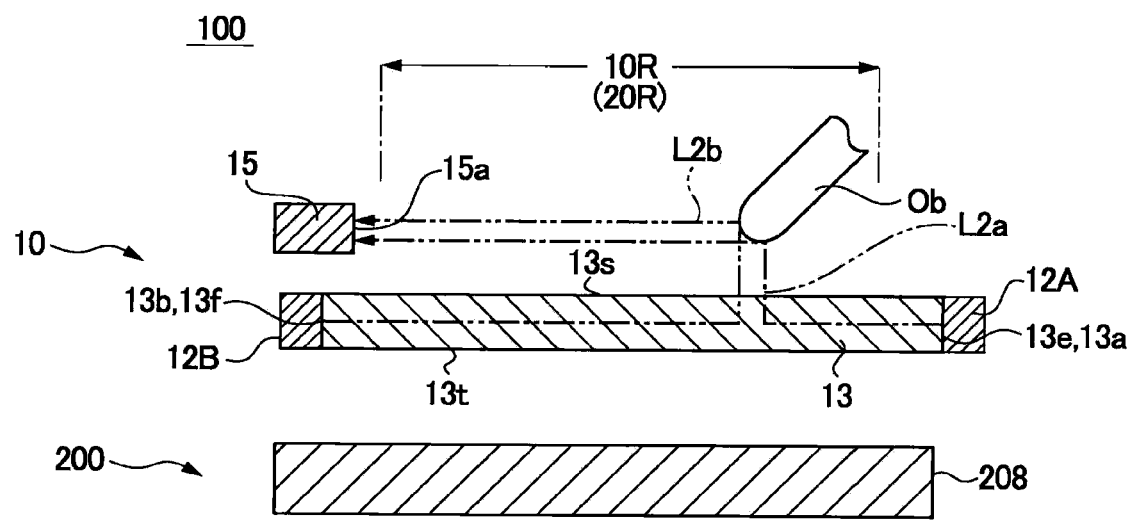
FIG. 6 is an explanatory view illustrating a cross-sectional configuration of an optical position detection apparatus according to a modified example 1 of the invention.

FIG. 5 and FIG. 6 are an exploded perspective view of the optical position detection apparatus 10 and the display apparatus 100 having position detection function according to the modified example 1 of the invention, and an explanatory view illustrating a cross-sectional configuration thereof. In the display apparatus 100 having position detection function in this embodiment, since the configuration of the optical position detection apparatus 10 is the same as that of the above-described embodiment, the common parts are designated with the same reference symbols and the explanation thereof will be omitted.

The display apparatus 100 having position detection function shown in FIGS. 5 and 6 includes the optical position detection apparatus 10 and the image generation apparatus 200, and the optical position detection apparatus 10 includes the position detection light source 12 emitting position detection light, the light guide plate 13, and the optical detector 15 having the light receiving portion 15a directed to the detection area 10R. The image generation apparatus 200 is a direct view type display apparatus 208 such as an organic electroluminescence apparatus and a plasma display apparatus, and is disposed opposite to the input operation side with respect to the optical position detection apparatus 10. The direct view type display apparatus 208 includes an image display area 20R which is overlapped with the light guide plate 13 when seen from the plane, and the image display area 20R overlaps with the detection area 10R when seen from the plane.

Figure 7:
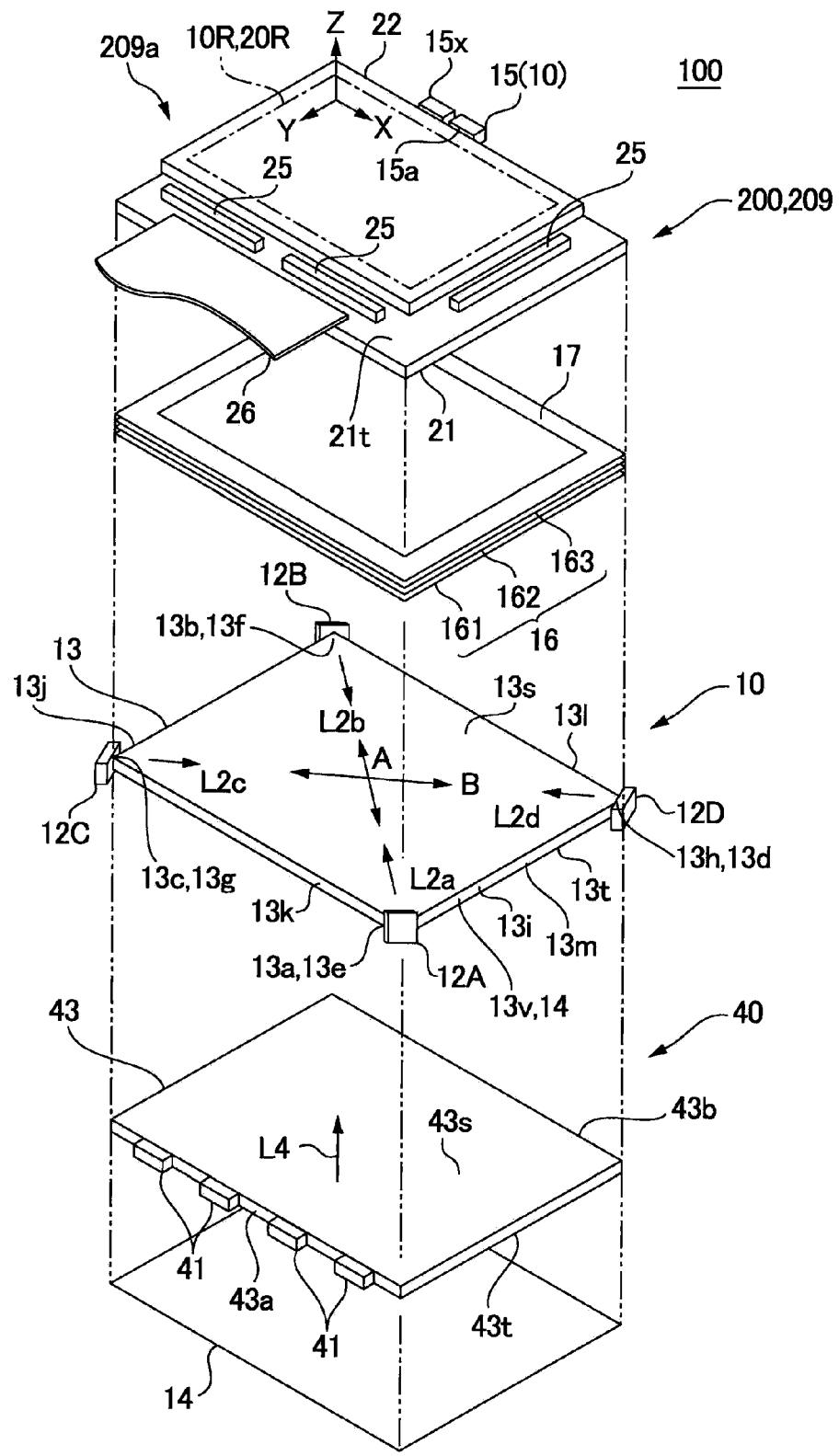
FIG. 7 is an exploded perspective view of an optical position detection apparatus according to a modified example 2 of the invention.
Figure 8:
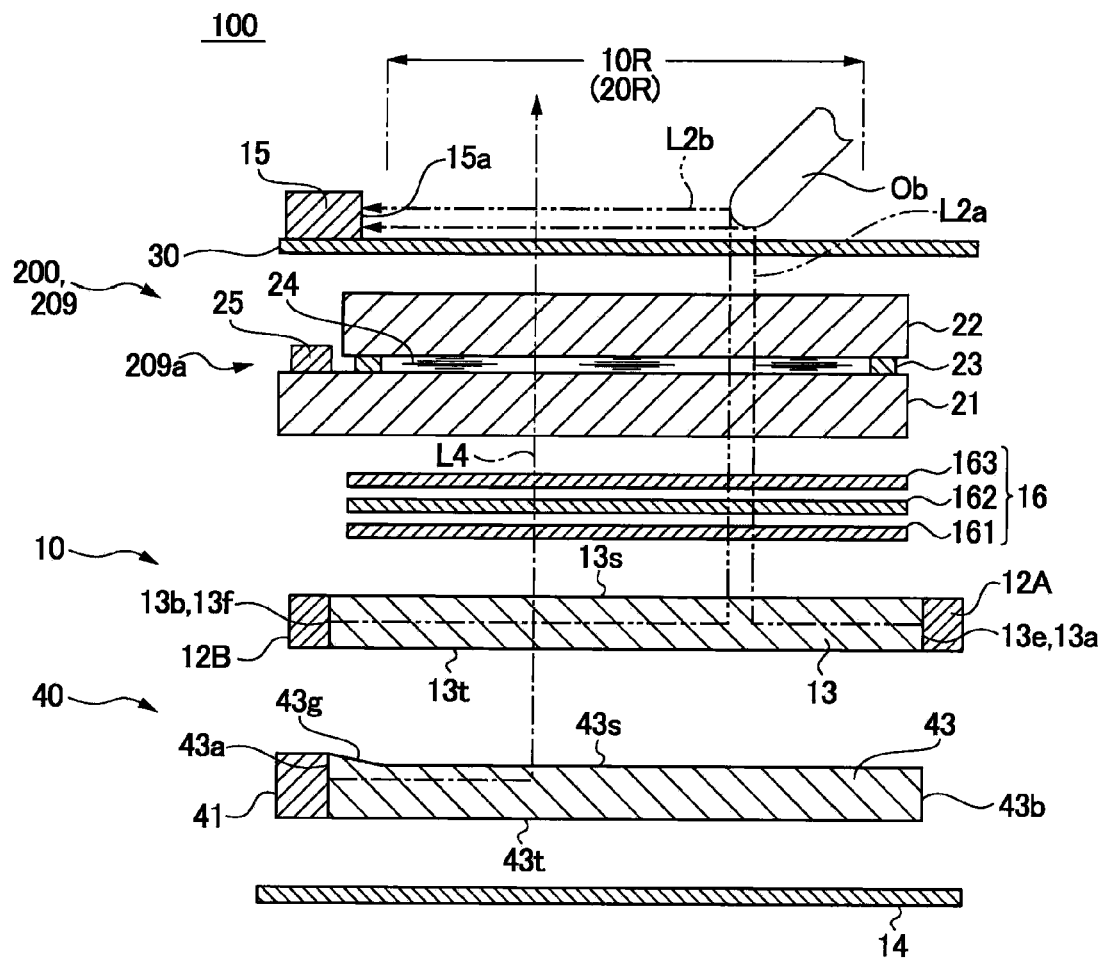
FIG. 8 is an explanatory view illustrating a cross-sectional configuration of an optical position detection apparatus according to a modified example 2 of the invention.

Modified Example 2 of Display Apparatus 100 Having Position Detection Function FIGS. 7 and 8 are explanatory views of the optical position detection apparatus 10 and the display apparatus 100 having position detection function according to the modified example 2 of the invention. FIG. 7 and FIG. 8 are an exploded perspective view of the optical position detection apparatus 10 and the display apparatus 100 having position detection function according to the modified example 2 of the invention, and an explanatory view illustrating a cross-sectional configuration thereof, respectively. In the display apparatus 100 having position detection function in this embodiment, since the configuration of the optical position detection apparatus 10 is the same as that of the above-described embodiment, the common parts are designated with the same reference symbols and the explanation thereof will be omitted.

The display apparatus 100 having position detection function shown in FIGS. 7 and 8 includes the optical position detection apparatus 10 and the image generation apparatus 200, and the optical position detection apparatus 10 includes the position detection light source 12 emitting position detection light, the light guide plate 13, and the optical detector 15 having the light receiving portion 15a directed to the detection area 10R. The image generation apparatus 200 includes a liquid crystal apparatus 209 which is a direct view type display apparatus and a light transmissive cover 30. The liquid crystal apparatus 209 includes an image display area 20R which is overlapped with the light guide plate 13 when seen from the plane, and the image display area 20R overlaps with the detection area 10R when seen from the plane.

In the display apparatus 100 having position detection function of this embodiment, an optical sheet 16 is disposed on the light emitting side of the light guide plate 13 for making the position detection light L2a to L2d uniform, as necessary. In this embodiment, as the optical sheet 16, a first prism sheet 161 opposing the light emitting surface 13s of the light guide plate 13, a second prism sheet 162 opposing the first prism sheet 161 on the side opposite to the side where the light guide plate 13 is located, and a light diffusion plate 163 opposing the second prism sheet 162 on the side opposite to the side where the light guide plate 13 is located. Further, a rectangular frame-like light shielding sheet 17 is disposed around the optical sheet 16 on the side opposite to the side where the light guide plate 13 is located with respect to the optical sheet 16. The light shielding sheet 17 prevents the position detection light L2a to L2d emitted from the position detection light sources 12A to 12D from leaking.

The liquid crystal apparatus 209 (the image generation apparatus 200) includes a liquid crystal panel 209a on the side opposite to the side where the light guide plate 13 is located with respect to the optical sheet 16 (the first prism sheet 161, the second prism sheet 162, and the light diffusion plate 163). In this embodiment, the liquid crystal panel 209a is a light transmissive liquid crystal panel and has a structure that two light transmissive substrates 21 and 22 are bonded by a sealing material 23 and a liquid crystal 24 is filled between the substrates. In this embodiment, the liquid crystal panel 209a is an active matrix type liquid crystal panel, in which light transmissive pixel electrodes, data lines, scanning lines, and pixel switching elements (not shown) are formed on one of the two light transmissive substrates 21 and 22, and light transmissive common electrodes (not shown) are formed on the other thereof. The pixel electrodes and the common electrodes may be formed on the same substrate. In the liquid crystal panel 209a, if a scan signal is output via the scanning line for each pixel and an image signal is output via the data line, orientation of the liquid crystal 24 is controlled in each of a plurality of the pixels, and thus an image is formed in the image display area 20R.

In the liquid crystal panel 209a, one light transmissive substrate 21 is provided with a substrate extension 21t which is extended to the periphery from the contour of the other light transmissive substrate 22. Electronic components 25 constituting a drive circuit and the like are mounted on the surface of the substrate extension 21t. Further, a wiring member 26 such as a flexible printed circuit board (FPC) is connected to the substrate extension 21t. Only the wiring member 26 may be mounted on the surface of the substrate extension 21t. A polarization plate (not shown) is disposed on the outer surface side of the light transmissive substrate 21, 22, as necessary.

Here, in order to detect a plane position of the target object Ob, it is necessary to emit the position detection light L2a to L2d toward the observation side where operation by the target object Ob is performed, and the liquid crystal panel 209a is disposed closer to the observation side (operation side) than the light guide plate 13 and the optical sheet 16. Thus, in the liquid crystal panel 209a, the image display area 20R is configured to transmit the position detection light L2a to L2d. When the liquid crystal panel 209a is disposed on the side opposite to the observation side of the light guide plate 13, it is not necessary to configure such that the image display area 20R transmits the position detection light L2a to L2d. However, instead of this, it is necessary to configure such that the image display area 20R can be seen from the observation side through the light guide plate 13.

The liquid crystal device 209 includes an illuminating device 40 for illuminating the liquid crystal panel 209a. In the present embodiment, the illuminating device 40 is disposed between the light guide plate 13 and the reflection plate 14 at the side of the light guide plate 13 facing the side where the liquid crystal panel 209a is located. The illuminating device 40 includes a light source 41 for illumination and a light guide plate 43 for illumination, which emits illumination light emitted from the light source 41 for illumination while making the illumination light propagate. The light guide plate 43 for illumination has a rectangular flat shape. The light source 41 for illumination is formed by a light emitting element, such as an LED (light emitting diode), and emits, for example, white illumination light L4 in response to a driving signal output from a driving circuit (not shown). In the present embodiment, a plurality of light sources 41 for illumination is arrayed along a side portion 43a of the light guide plate 43 for illumination.

In the light guide plate 43 for illumination, an inclined surface 43g is provided in a surface portion at the light emission side adjacent to the side portion 43a (outer peripheral portion of a light emitting surface 43s at the side portion 43a side). The thickness of the light guide plate 43 for illumination increases gradually toward the side portion 43a. By the light incidence structure having the inclined surface 43g, the height of the side portion 43a is made equal to the height of the light emission surface of the light source 41 for illumination while suppressing an increase in the thickness of a portion where the light emitting surface 43s is provided.

In this illuminating device 40, the illumination light emitted from the light source 41 for illumination is incident from the side portion 43a of the light guide plate 43 for illumination onto the inside of the light guide plate 43 for illumination, propagates through the inside of the light guide plate 43 for illumination toward the outer edge 43b of the opposite side, and then is emitted from the light emitting surface 43s which is one surface. Here, the light guide plate 43 for illumination has a light guide structure in which the ratio of light amount of light, which is emitted from the light emitting surface 43s, to internal propagating light, which propagates from the side portion 43a side toward the outer edge 43b on the opposite side, increases steadily. For example, this light guide structure is realized by gradually increasing the area of a fine uneven refraction surface for light deflection or light scattering, which is formed on the light emitting surface 43s or the back surface 43t of the light guide plate 43 for illumination, the formation density of the printed scattering layer, and the like toward the internal propagation direction. By providing such a light guide structure, the illumination light L4 incident from the side portion 43a is emitted almost uniformly from the light emitting surface 43s.

In the present embodiment, the light guide plate 43 for illumination is disposed so as to overlap the image display area 20R of the liquid crystal panel 209a in plan view at the opposite side of the viewing side of the liquid crystal panel 209a, and functions as a so-called backlight. However, the light guide plate 43 for illumination may be disposed at the viewing side of the liquid crystal panel 209a so as to function as a so-called front light. Moreover, although the light guide plate 43 for illumination is disposed between the light guide plate 13 and the reflecting plate 14 in the present embodiment, the light guide plate 43 for illumination may also be disposed between the optical sheet 16 and the light guide plate 13. In addition, the light guide plate 43 for illumination and the light guide plate 13 may be formed using a common light guide plate. In addition, in the present embodiment, the optical sheet 16 is commonly used between the position detection light L2a to L2d and the illumination light L4. However, an optical sheet for exclusive use may also be disposed at the light emission side of the light guide plate 43 for illumination, separately from the optical sheet 16. In this case, a light scattering plate which performs a sufficient light scattering operation is used in many cases in order to make uniform the planar luminance of the illumination light L4 emitted from the light emitting surface 43s in the light guide plate 43 for illumination. However, the position detection is interrupted if the position detection light L2a to L2d emitted from the light emitting surface 13s in the light guide plate 13 for position detection is largely scattered. For this reason, since a light scattering plate is not provided or it is necessary to use a light scattering plate which performs a relatively slight light scattering operation, it is preferable that the light scattering plate is a dedicated component of the light guide plate 43 for illumination. However, optical sheets with a condensing operation, such as a prism sheet (first or second prism sheet 161 or 162) may be commonly used.

Example of Mounting into an Electronic Apparatus

Figure 9A:
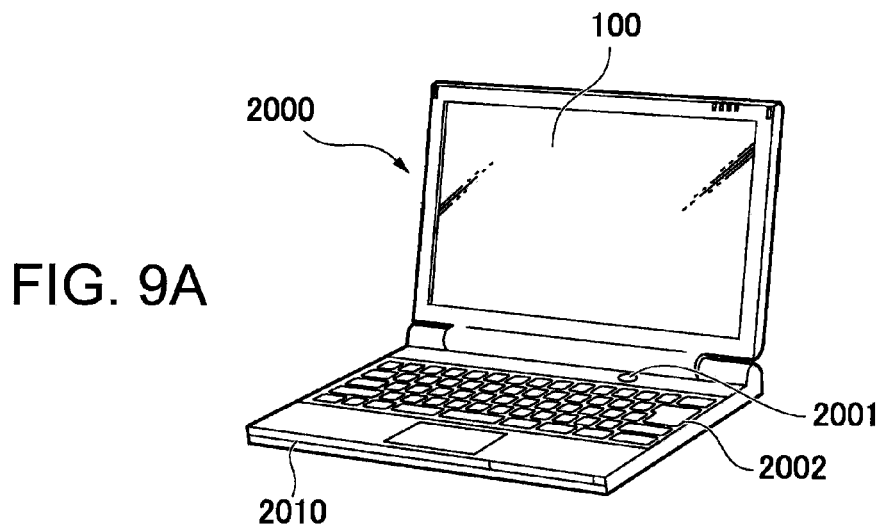
FIGS. 9A to 9C are explanatory views illustrating an electronic appliance using a display apparatus having position detection function according to an aspect of the invention.
Figure 9B:
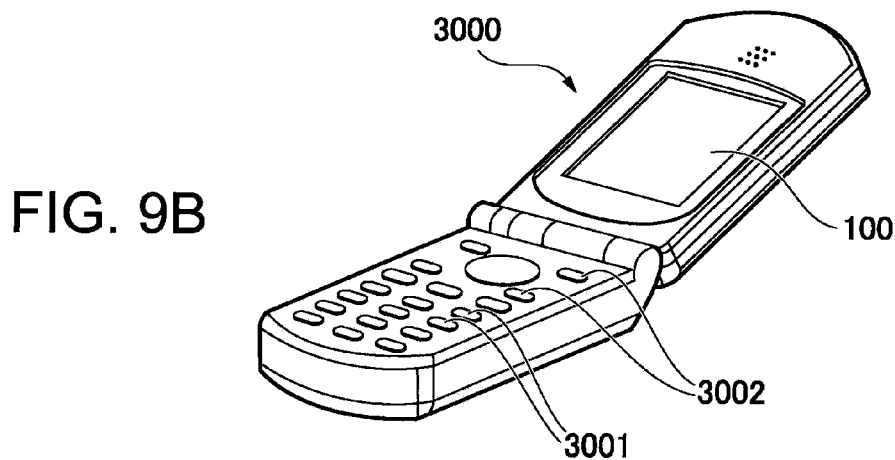
Figure 9C:
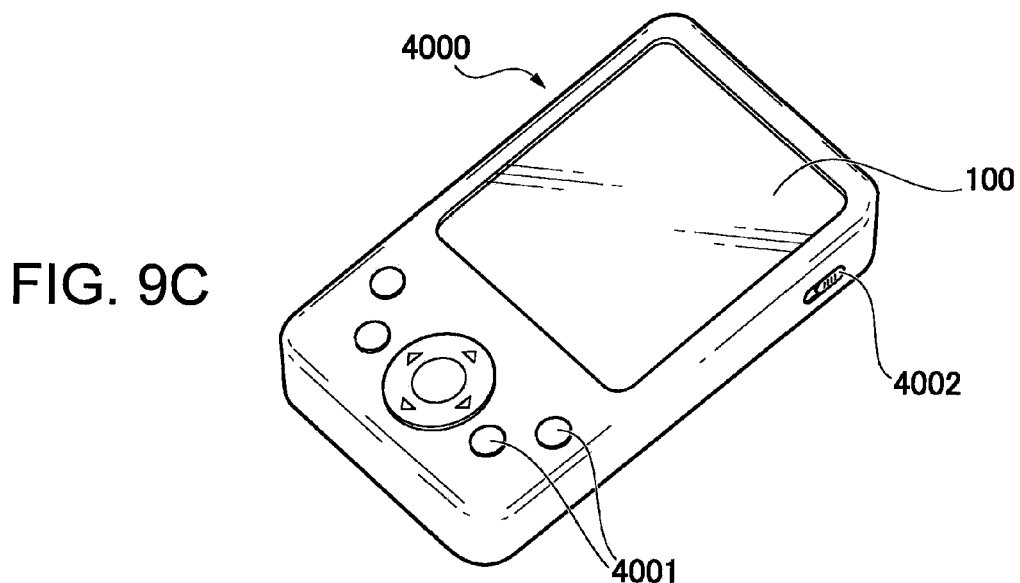

An electronic apparatus to which the display apparatus 100 having a position detection function, which has been described with reference to FIGS. 5 to 8, is applied will be described with reference to FIGS. 9A to 9C. FIGS. 9A to 9C are explanatory views showing an electronic apparatus using the display apparatus 100 having a position detection function according to the embodiment of the invention. FIG. 9A is a view illustrating the configuration of a mobile type personal computer including a display apparatus 100 having a position detection function. A personal computer 2000 includes the display apparatus 100 with a position detection function as a display unit and a main body 2010. A power switch 2001 and a keyboard 2002 are provided in the main body 2010. FIG. 9B is a view illustrating the configuration of a mobile phone including the display apparatus 100 having a position detection function. A mobile phone 3000 includes a plurality of operation buttons 3001, a plurality of scroll buttons 3002, and the display apparatus 100 having a position detection function as a display unit. A screen displayed on the display apparatus 100 having a position detection function is scrolled by operating the scroll buttons 3002. FIG. 9C is a view illustrating the configuration of a personal digital assistant (PDA) to which the display apparatus 100 having a position detection function is applied. A personal digital assistant 4000 includes a plurality of operation buttons 4001, a power switch 4002, and the display apparatus 100 having a position detection function as a display unit. By operating the power switch 4002, various kinds of information, such as an address list or a schedule book, are displayed on the display apparatus 100 having a position detection function.

In addition, examples of an electronic apparatus to which the display apparatus 100 having a position detection function is applied include a digital still camera, a liquid crystal television, a view finder type or monitor direct view type video tape recorder, a car navigation system, a pager, an electronic diary, an electronic calculator, a word processor, a workstation, a video phone, a POS terminal, a bank terminal, and the like, as well as those shown in FIGS. 9A to 9C. In addition, the display apparatus 100 having a position detection function described above may be applied as a display unit of each of the various kinds of electronic apparatuses.

What is claimed is:

1. An optical position detection apparatus for optically detecting a position of a target object in a detection area, comprising:
   position detection light sources that emit position detection light irradiated onto the target object;
   a light guide plate that receives the position detection light therein and emits the received position detection light onto the detection area to form an intensity distribution of a light emission quantity of the position detection light in the detection area;
   a light detector having light receiving portions arranged facing toward the detection area to receive the position detection light that is reflected by the target object; and
   a signal processing portion that detects the position of the target object based on the intensity distribution of the light emission quantity in the detection area,
   wherein the light guide plate includes light incident portions for receiving the position detection light and side portions except for the light incident portions are provided on outer periphery side portions of the light guide plate when the light guide plate is seen in a plan view,
   a light emission surface that emits the position detection light incident from the light incident portions toward the detection area is provided on a plane portion of the light guide plate when the light guide plate is seen in a plan view, and
   at least a portion of the side portions is an anti-reflection surface that prevents reflection of the position detection light in the light guide plate.

2. The optical position detection apparatus according to claim 1, wherein an entire surface of the side portion is the anti-reflection surface.

3. The optical position detection apparatus according to claim 1, wherein the anti-reflection surface is formed by a light absorption layer on the side portion.

4. The optical position detection apparatus according to claim 1, wherein the light guide plate is shaped as a tetragon, and the light incident portions are provided in portions corresponding to corners of the tetragon.

5. The optical position detection apparatus according to claim 4, wherein four position detection light sources are provided, and the light incident portions are provided on portions that correspond to four corners of the tetragon shaped light guide plate.

6. The optical position detection apparatus according to claim 5, wherein two neighboring position detection light sources among the four position detection light sources simultaneously emit the position detection light.

7. A display apparatus having a position detection function comprising:
   the optical position detection apparatus as described in claim 1; and
   an image generation apparatus that forms an image on an overlapping area when the light guide plate is seen in a plan view.

8. An optical position detection apparatus for optically detecting a position of a target object, comprising:
   a light guide plate having light incident portions provided on four corner portions of an outer periphery portion;
   four position detection light sources that emit position detection light toward the light incident portions;
   a light detector that receives the position detection light which is emitted from one surface in a thickness direction of the light guide plate and is reflected by the target object; and
   a signal processing portion that detects the position of the target object based on the result of light received in the light detector,
   wherein the four position detection light sources emit the position detection light through an alternate light-up sequence by changing a combination of one portion of the position detection light sources and the other portion of the position detection light sources the number of which is equal to that of the one portion of the position detection light sources, and
   at least a portion of the outer periphery portions of the light guide plate except for the light incident portions is an anti-reflection surface that prevents reflection of the position detection light in the light guide plate.

9. The optical position detection apparatus according to claim 8, wherein an entirety of the outer periphery portions of the light guide plate except for the light incident portions is the anti-reflection surface.

10. The optical position detection apparatus according to claim 8, wherein the anti-reflection surface is configured by a light absorption layer on the outer periphery portion of the light guide plate.

11. The optical position detection apparatus according to claim 8, wherein the outer periphery portions of the light guide plate includes the light incident portions provided on four corner portions thereof, and the light detector is arranged in an overlapping position in a thickness direction of the light guide plate with a center of the side portion that is interposed between the neighboring two corner portions among the four corner portions.

12. The optical position detection apparatus according to claim 8, wherein the position detection light is composed of infrared rays.

13. The optical position detection apparatus according to claim 8, wherein the light guide plate has one surface that crosses a direction in which the image is projected.

14. A projection display apparatus having a position detection function comprising:
   the optical position detection apparatus as described in claim 13; and
   an image projection apparatus that projects the image.

* * * * *